TRANSMISSION LINE CIRCUIT HAVING TERMINATION IMPEDANCE
WHICH INCLUDES EMITTER JUNCTION OF TRANSISTOR
Filed June 18, 1962
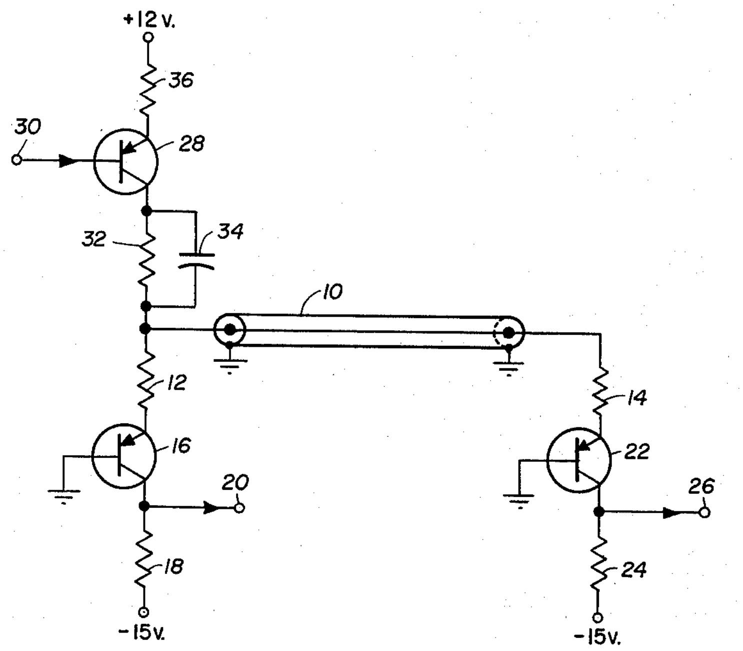
INVENTOR.
JOHN R. KOBBE
BY
BUCKHORN, CHEATHAM & BLORE
ATTORNEYS

United States Patent Office 3,168,656
Patented Feb. 2, 1965

3,168,656

TRANSMISSION LINE CIRCUIT HAVING TERMINATION IMPEDANCE WHICH INCLUDES EMITTER JUNCTION OF TRANSISTOR

John R. Kobbe, Beaverton, Oreg., assignor to Tektronix, Inc., Beaverton, Oreg., a corporation of Oregon
Filed June 18, 1962, Ser. No. 203,144
9 Claims. (Cl. 307—88.5)

The present invention relates generally to electrical signal transmission lines which are terminated in a manner enabling efficient use of signal energy transmitted through such lines while preventing signal reflections in such lines, and in particular is directed to a termination circuit for a delay line which includes a transistor connected with its emitter junction forming part of a termination impedance for the delay line which is approximately equal to the characteristic impedance of such delay line.

The transmission line termination circuit of the present invention is especially useful as the termination for a delay line in the vertical deflection circuit of a triggered type cathode ray oscilloscope. Conventional triggered oscilloscopes which can be employed to display the signal waveform of a transient or non-periodic electrical signal, are usually constructed so that the trigger signal may be obtained from the vertical input signal which is applied to the vertical plates of the cathode ray tube in such oscilloscope. Such trigger signal is transmitted to the time base sweep generator in order to start the production of a sweep voltage. The sweep voltage is applied to the horizontal deflection plates of the cathode ray tube and the vertical input signal is applied to the vertical deflection plates of such oscilloscope after the sweep voltage has been started. This is accomplished by transmitting the vertical input signal to the vertical deflection plates through a delay line. In order to prevent spurious signals caused by reflections of signal energy in the delay line from reaching the vertical deflection plates, at least the input end of the delay line must be properly terminated in an impedance very nearly equal to the characteristic impedance of the line.

In previous oscilloscopes the output end of the delay line has generally been connected directly across the vertical deflection plates to provide a termination of such output end which is much higher than the characteristic impedance of the line. The input end of such delay line has been connected to a termination impedance equal to that of the characteristic impedance of such delay line. As a result the vertical input signals are transmitted through the delay line to the deflection plates and are reflected from the output end of such delay line to the input end where they are absorbed in such termination impedance. This type of circuit provides maximum deflection voltage since the voltage applied to the deflection plates is equal to approximately twice that obtained when the output end of the delay line is also terminated by an impedance equal to the characteristic impedance of the line. Such circuit, however, requires an expensive and difficult to construct delay line and input end terminating impedance both of which must be nearly perfect. Otherwise reflection from the output end of the delay line can result in spurious vertical deflections due to re-reflections from any discontinuities in the delay line or from an imperfect termination of the input end of such line.

Spurious signals due to re-reflection of signal energy in a delay line can be largely prevented by terminating both the output and input ends of such delay line with an impedance substantially equal to the characteristic impedance of the line, even when the line and terminating impedance depart considerably from the perfect line and terminating impedance discussed above. However, as previously indicated, this reduces the output voltage available for deflection by approximately one-half.

By employing a current-actuated amplifying transistor as part of the output end termination impedance in accordance with the present invention, however, the gain of such transistor more than compensates for any loss of signal energy due to termination of the output line in its characteristic impedance.

Briefly, one embodiment of the transmission line circuit of the present invention includes a delay line of substantially uniform characteristic impedance having its input end terminated in an impedance substantially equal to the characteristic impedance of the line. At the output end of the line a resistor and the emitter junction of an amplifying transistor are connected in series to form the terminating impedance which is connected to ground at the base of such transistor. The sum of the resistances of the resistor and the emitter junction is made substantially equal to the characteritic impedance of the line. The transistor is connected as a common base amplifier so that signal current flowing through the emitter junction provides a voltage output at the collector of the transistor. Such voltage can be applied either before or after further amplification, to the vertical deflection plates of the cathode ray tube. The termination for the input end of the line may be a circuit similar to the output end termination to provide a voltage output from which a trigger signal can be obtained for starting the sweep voltage applied to the horizontal deflection plates of such tube.

It is therefore one object of the present invention to provide an improved transmission line termination circuit.

Another object of the invention is to provide an improved transmission line termination circuit in which signal reflections are minimized and efficient signal transmssion is achieved.

A further object of the present invention is to provide a transmission line circuit for the efficient transmission of signals in which the emitter junction of a transistor forms at least a portion of a termination impedance for such transmission line.

An additional object of the present invention is to provide an improved delay line circuit for the vertical deflection circuit of a cathode ray oscilloscope in which a pair of transistors connected as common base amplifiers have their emitter junctions each forming part of termination impedances connected at the input and output of such delay line in order to obtain amplified signal voltages from both ends of such line, while preventing spurious signals due to reflections in such line.

Other objects and advantages of the invention will be apparent from the following detailed description of a preferred embodiment thereof shown in the attached drawing of which:

The single figure is a schematic diagram of a circuit including a transmission line termination in accordance with the present invention.

Referring to the drawing, the circuit of the figure includes a delay line 10 which may be a pair of wires wound in opposite directions on a supporting core, a coaxial cable, or artificial transmission line made up of a plurality of substantially identical sections containing inductance and capacitance which are properly adjusted to provide a substantially uniform characteristic impedance. A first termination resistor 12 has one terminal connected to the input terminal of delay line 10 while a second termination resistor 14 also has one terminal connected to the output terminal of such delay line. Each of the termination resistors may actually be a complex series-parallel impedance containing inductance and capacitance as well as resistance in order to match the actual complex characteristic impedance of the line. The other terminal of the first termination resistor 12 is connected to the emitter of a first termination transistor 16, which may be a PNP-type transistor, for example, a 2N1143 transistor, having its base connected to ground. The collector of transistor 16 is connected to a source of negative D.C. bias voltage through a load resistor 18 so that such transistor functions as a common base amplifier to produce an amplified output signal at a first output terminal 20 connected across such first load resistor. A second termination transistor 22, which also may be a PNP-type transistor, such as a 2N711 transistor, has its emitter connected to the other terminal of the second termination resistor 14 and its base connected to ground. The collector of the second termination transistor 22 is connected to a source of negative D.C. bias voltage through a second load resistor 24 so that such transistor is also connected as a common base amplifier and produces an amplified output signal at a second output terminal 26 connected across the load resistor 24.

The input signal to the delay line termination circuit is supplied by an input amplifier transistor 28 which, for example, may be a PNP-type 2N828 transistor, having its base connected to an input terminal 30 and its collector connected to the input end of the delay line 10 through a high frequency compensation circuit including a resistor 32 shunted by a bypass capacitor 34 to compensate for the distributed capacitance in the delay line. The emitter of input amplifier transistor 28 is connected to a source of positive D.C. bias voltage through an emitter bias resistor 36. The transistor 28 is thus connected as a common emitter amplifier so that it inverts and amplifies the vertical input signal applied to input terminal 30 before transmitting it to the input terminal of delay line 10. Since the input termination impedance formed by resistor 12 and transistor 16 is equal to the output termination impedance including resistor 14 and transistor 22, and both equal the characteristic impedance of the delay line, approximately one-half of the input signal current is transmitted through each termination resistor. Termination transistors 16 and 22 are normally biased so as to be conducting which means that their emitter junctions are forward biased and have an impedance of approximately five ohms. If the characteristic impedance of the delay line 10 is 85 ohms, termination resistors 12 and 14 must each be 80 ohms so that the total termination impedance at both ends of the line is equal to the characteristic impedance of the line.

It will be noted that the emitter junction of each transistor 16 and 22 is connected in series with a resistor 12 or 14 between an end terminal of the delay line and ground. This series connection causes all of the signal current flowing in the delay line to also flow through the emitter junction of the termination transistor 22, where it serves as the driving signal for such transistor. Thus the delay line termination circuit of the present invention makes more efficient use of signal energy than conventional termination circuits while at the same time preventing signal reflections in the delay line. It should also be noted that the emitter junction resistance of the termination transistors 16 and 22 may vary slightly with the input signal. However, when such termination transistors are operated as class A amplifiers this impedance variation is negligible and the total termination impedance remains substantially constant at a value equal to the characteristic impedance of the delay line.

When the delay line termination of the present invention is employed as part of the vertical deflection circuit of a cathode ray oscilloscope, the input signal applied to input terminal 30 may be the vertical input signal from the vertical preamplifier of such oscilloscope. Also the output signal supplied to the first output terminal 20 may be used as the trigger signal for controlling the operation of the time base sweep generator circuit, while the output signal from the second output terminal 26 may be transmitted as the delayed vertical signal to the vertical amplifier where it is amplified and converted into a push-pull signal which is applied to the vertical deflection plates of the cathode ray tube. It should be noted that the termination transistors 16 and 22 are connected as common base amplifiers to provide both a high voltage gain and a very low input resistance which can serve as part of the termination resistance for the delay line. It is possible to connect the termination transistors as common emitter amplifiers to provide an even larger voltage gain and higher input impedance. The emitter junction impedance can thus form the entire termination impedance of the delay line if it is equal to the characteristic impedance of such line. However, the input resistance provided by such a connection is quite high, in the order of several hundred ohms, and has a tendency to vary with the input signal so that the common base amplifier configuration is preferred. Typical values of the components employed in the above-described circuit are as follows: Delay line 10 characteristic impedance=85 ohms; resistors 12 and 14=80 ohms; resistor 18=3.3 kilohms; resistor 24=700 ohms; resistor 32=50 ohms; capacitor 34=100 micromicrofarads; and resistor 36=375 ohms.

It will be obvious to those having ordinary skill in the art that various changes may be made in the above-described preferred embodiment of the present invention without departing from the spirit of the invention. For example, a termination impedance including a junction of a termination transistor may be employed at one end of the line only while the other end of the line may be terminated by a resistance only or may have any other type of suitable termination including open circuit and short circuit terminations. Therefore, it is not intended to limit the scope of the present invention to the above-described preferred embodiment but the scope of the invention should be determined only by the following claims.

I claim:

1. A transmission line circuit for transmitting electrical signals, comprising:

a transmission line having a substantially uniform characteristic impedance;

termination means for an end of said line providing a terminating impedance substantially equal to said characteristic impedance so that signal current flows through said terminating impedance, said termination means including at least one transistor having its emitter junction forming at least part of said terminating impedance;

means connecting the emitter and base of said transistor between said end of said line and ground so that substantially all of said signal current flows through said emitter junction; and a means connecting the collector of said transistor to an output terminal.

2. An electrical signal transmission line circuit, comprising:

an input terminal;

a transmission line having a substantially uniform characteristic impedance and connected at one end of said input terminal;

a termination resistor having a first terminal and a second terminal and connected at its first terminal to the output end of said transmission line;

a transistor device having emitter, base and collector;

electrode means connecting said emitter and base between the second terminal of said termination resistor and ground so that the emitter junction of said transistor is connected in series with said termination resistor to provide a termination impedance between the signal conductor of said transmission line and ground;

means connecting said collector to an output terminal; and means to apply a bias voltage across said emitter junction so that the sum of the resistance of said emitter junction and said termination resistor is substantially the same as the characteristic impedance of said transmission line in order to prevent signal reflections in said transmission line and to transmit larger amplitude output terminal signals from the output of said semiconductor device.

3. An electrical signal transmission line circuit, comprising:
a transmission line having an inner signal-carrying conductor and a substantially uniform characteristic impedance;
a termination resistor having a first treminal and a second terminal and connected at its first terminal to one end of said signal conductor of said transmission line;
a transistor having emitter, base and collector electrodes;
means connecting said emitter to the second terminal of said termination impedance and said base to ground so that the emitter junction impedance of said transistor is connected in series with said termination resistor to provide a termination impedance between said one end of the signal conductor of said transmission line and ground;
means connecting said collector to an output terminal; and
means to apply a forward bias voltage across said emitter junction so that the sum of the resistance of said emitter junction and said termination resistor is substantially the same as the characteristic impedance of said transmission line in order to prevent signal reflections in said transmission line and to transmit larger amplitude output signals from the collector of said transistor.

4. An electrical pulse delay line circuit, comprising:
a pulse delay line having an inner signal-carrying conductor and a substantially uniform characteristic impedance;
a termination resistor having a first terminal and a second terminal and connected at its first terminal to the output end of said signal conductor of said delay line;
a transistor having emitter, base and collector electrodes connected as a common base amplifier with its emitter connected to the second terminal of said termination resistor and its base connected to ground so that the emitter junction of said transistor is connected in series with said termination resistor to provide a termination impedance between said output end of the signal conductor of said delay line and ground;
a load resistor connected to the collector of said transistor and to an output terminal; and
voltage means to apply a forward direct current bias voltage across said emitter junction so that the sum of the resistance of said emitter junction and said termination resistor is substantially the same as the characteristic impedance of said delay line in order to absorb the energy of the signal transmitted through said delay line to prevent signal reflections in said transmission line, and to apply substantially all of the current of said transmitted signal as an input signal to the emitter of said transistor to produce a large amplitude output voltage signal on the collector of said transistor.

5. An electrical signal transmission circuit, comprising:
a transmission line of substantially uniform characteristic impedance having an input end and an output end;
a first termination resistor connected at one terminal to said input end of said transmission line;
a first transistor having emitter, base and collector electrodes connected at its emitter to another terminal of said first resistor so that its emitter junction is connected in series with said first resistance between said input end of said transmission line and ground to form the input termination impedance of said line, and connected at its collector to a first output terminal;
a second termination resistor connected at one terminal to said output end of said transmission line;
a second transistor having emitter, base and collector electrodes connected at its emitter to another terminal of said second resistor so that its emitter junction is connected in series with said second resistor between said output end of said transmission line and ground to form the output termination impedance of said line, and connected at its collector to a second output terminal; and
means to apply a bias voltage to said first transistor and said second transistor so that the sum of the emitter junction resistance of said first transistor and said first termination resistance is approximately equal to the characteristic impedance of said transmission line, and the sum of the emitter junction resistance of said transistor and said second termination resistance is also approximately equal to said characteristic impedance.

6. An electrical signal transmission circuit, comprising:
a transmission line of substantially uniform characteristic impedance having an outer shield conductor and inner signal conductor which has an input end and an output end;
a first termination resistance connected at one terminal to said input end of said transmission line;
a first transistor having emitter, base and collector electrodes connected as a common base amplifier having its emitter connected to another terminal of said first resistance, its base connected to ground, and its collector connected to a first output terminal;
a second termination resistance connected at one terminal to said output end of said transmission line;
a second transistor having emitter, base and collector electrodes connected as a common base amplifier having its emitter connected to another terminal of said second resistance, its base connected to ground, and its collector connected to a second output terminal; and
means to apply a forward bias voltage to said first transistor and said second transistor so that the sum of the emitter junction resistance of said first transistor and said first termination resistance is approximately equal to the characteristic impedance of said transmission line, and the sum of the emiter junction resistance of said second transistor and said second termination resistance is also approximately equal to said characteristic impedance.

7. An electrical signal take-off circuit, comprising:
a pulse delay transmission line of substantially uniform characteristic impedance having an input end and an output end and a frequency response from direct current to several megacycles per second;
a source of input signals connected to the input end of said transmission line;
a first termination resistance connected at one terminal to said input end of said transmission line;
a first semiconductor device having emitter, base and collector electrodes connected at its emitter to another terminal of said first resistance, connected at its base to ground, and connected at its collector to a first output terminal in order to extract a portion of said input signal and transmit said signal portion to said first output terminal;
a second termination resistance connected at one terminal to said output end of said transmission line;
a second semiconductor device having emitter, base and collector electrodes connected at its emitter to another terminal of said second resistance, connected at its base to ground, and connected at its collector to a second output terminal in order to extract a portion of said input signal and transmit said signal portion to said first output terminal; and means to apply a forward bias voltage to said first transistor and said second transistor so that the sum of the emitter junction resistance of said first transistor and said first termination resistance is approximately equal to the characteristic impedance of said transmission line, and the sum of the emitter junction resistance of said second transistor and said second termination resistance is also approximately equal to said characteristic impedance, in order to prevent signal reflections in said transmission line.

8. An electrical signal transmission circuit for the vertical signal of a cathode ray oscilloscope, comprising:

a pulse delay transmission line of substantially uniform characteristic impedance having an input end and an output end and frequency response from direct current to several megacycles per second;

a source of vertical input signals connected to the input end of said transmission line;

a first termination resistance connected at one terminal to said input end of said transmission line;

a trigger take-off circuit including a first transistor having emitter, base and collector electrodes connected as a common base amplifier having its emitter connected to another terminal of said first termination resistance, its base connected to ground, and its collector connected to a first load resistance and a first output terminal;

a second termination resistance connected at one terminal to said output end of said transmission line;

a vertical amplifier circuit including a second transistor having emitter, base and collector electrodes connected as a common base amplifier having its emitter connected to another terminal of said second termination resistance, its base connected to ground, and its collector connected to a second load resistance and a second output terminal; and means to apply a forward bias voltage to said first transistor and said second transistor so that the sum of the emitter junction resistance of said first transistor and said first termination resistance is approximately equal to the characteristic impedance of said transmission line, and the sum of the emitter junction resistance of said second transistor and said second termination resistance is also approximately equal to said characteristic impedance, in order to transmit a portion of the vertical input signal produced by said source to said first output terminal to serve as the trigger signal for the horizontal sweep generator of said oscilloscope and to transmit another portion of said vertical input signal to the vertical deflection plates of said oscilloscope after a time delay determined by said transmission line while preventing reflection of said vertical input signal in said transmission line.

9. A transmission line circuit for transmitting electrical signals, comprising:

a transmission line having a substantially uniform characteristic impedance;

termination means including at least one transistor and at least one resistor, for terminating at least one end of said line in a termination impedance substantially equal to said characteristic impedance to prevent signal reflections therefrom;

means connecting said transistor as a common base amplifier with its emitter junction in series with said resistor to form at least part of said termination impedance; and means connecting the collector of said transistor to an output terminal.

References Cited in the file of this patent

UNITED STATES PATENTS

| | | |
|---|---|---|
| 2,571,045 | Macnee | Oct. 9, 1951 |
| 2,652,460 | Wallace | Sept. 15, 1953 |
| 2,802,068 | Harwood | Aug. 6, 1957 |

OTHER REFERENCES

"Junction Transistor Electronics," by Hurley, published by John Wiley and Sons, Inc., copyright 1958. Pages 56–64 relied upon.

UNITED STATES PATENT OFFICE
CERTIFICATE OF CORRECTION

Patent No. 3,168,656

February 2, 1965

John R. Kobbe

It is hereby certified that error appears in the above numbered patent requiring correction and that the said Letters Patent should read as corrected below.

Column 4, line 64, strike out "device"; same line 64, strike out the semicolon; line 65, for "electrode" read -- electrodes; --; same line 65, "means connecting said" should appear as a new paragraph; column 5, line 5, strike out "terminal"; line 6, for "output of said semiconductor device" read -- output terminal of said transistor --; same column 5, line 12, for "treminal" read -- terminal --.

Signed and sealed this 22nd day of June 1965.

(SEAL)
Attest:

ERNEST W. SWIDER
Attesting Officer

EDWARD J. BRENNER
Commissioner of Patents